US012172337B1

(12) United States Patent
Wang

(10) Patent No.: US 12,172,337 B1
(45) Date of Patent: Dec. 24, 2024

(54) CHAINSAW BLADE, CARBIDE BLADE BLOCK AND CARBIDE CHAINSAW BLADE

(71) Applicant: Jiahui Wang, Shaoxing (CN)

(72) Inventor: Jiahui Wang, Shaoxing (CN)

( * ) Notice: Subject to any disclaimer, the term of this patent is extended or adjusted under 35 U.S.C. 154(b) by 0 days.

(21) Appl. No.: 18/643,742

(22) Filed: Apr. 23, 2024

(51) Int. Cl.
*B27B 33/14* (2006.01)

(52) U.S. Cl.
CPC .......... *B27B 33/144* (2013.01); *B27B 33/148* (2013.01); *Y10T 83/909* (2015.04); *Y10T 83/913* (2015.04)

(58) Field of Classification Search
CPC ........... B27B 33/14; B27B 33/142–148; Y10T 83/909; Y10T 83/925; Y10T 83/921; Y10T 83/913; Y10T 83/9319; Y10T 83/707; Y10T 83/9329; Y10T 83/917; Y10T 83/9362; Y10T 83/303; Y10T 83/263; B27G 19/003; A01G 3/086; B28D 1/124; B28D 1/082; B28D 1/125; B28D 1/08; B23D 65/00; B23D 65/02; B23D 61/18; B23D 57/023; B23D 61/14
See application file for complete search history.

(56) References Cited

U.S. PATENT DOCUMENTS 2,746,494 A * 5/1956 Cox ........................ E21C 35/19 83/834
2,976,900 A * 3/1961 Mills ..................... B27B 33/144 83/834
3,292,675 A * 12/1966 Bullard ................. B27B 33/144 83/834
3,467,155 A * 9/1969 Mckinney ............. B27B 33/142 83/831
4,841,824 A * 6/1989 Hartmann ............. B27B 33/144 83/835
10,010,942 B2 * 7/2018 Athad ........................ B23C 5/18
2024/0066744 A1 * 2/2024 Gibson ................. B27B 33/145

FOREIGN PATENT DOCUMENTS

CN 218342318 U * 1/2023 ............. B27B 33/14
CN 220761239 U * 4/2024 ............. B23D 61/16
EP 0223896 A2 * 6/1987 ............. B28D 1/125
GB 2052374 A * 1/1981 ............. B23D 61/14

OTHER PUBLICATIONS

CN-218342318-U English Translation; Jan. 20, 2023 Wang W.*

* cited by examiner

*Primary Examiner* — Laura M Lee
(74) *Attorney, Agent, or Firm* — Jeenam Park

(57) ABSTRACT

A chainsaw blade is provided, which includes a chainsaw blade body. A bottom of the chainsaw blade body is fixedly connected to a connecting portion, and a top thereof is fixedly connected to a depth limiting tooth and a cutting portion. A concave cutting groove is formed between the depth limiting tooth and the cutting portion. A fixing groove is provided on a side of the cutting portion close to the cutting groove, and a carbide blade block is provided on an inner wall of the fixing groove. The chainsaw blade is provided with a groove, welded and fixed with the carbide blade block. After forming an integrated structure, the blade that includes a blade body edge and a carbide blade block is processed.

14 Claims, 10 Drawing Sheets

CHAINSAW BLADE, CARBIDE BLADE BLOCK AND CARBIDE CHAINSAW BLADE

TECHNICAL FIELD

The present disclosure relates to the field of saw chains, and in particular to a chainsaw blade, a carbide blade block and a carbide chainsaw blade.

BACKGROUND

In the field of wood industry engineering, saw chain serves as a commonly utilized tool for various applications such as on-site logging, sawing, or cutting within workshop settings. The primary component of the saw chain is the chainsaw blade, which plays a crucial role in the cutting process. Due to its continuous contact with wood, the chainsaw blade undergoes high-speed friction, vibration, and elevated temperatures. Additionally, the varying textures of wood, ranging from soft to hard, contribute to the gradual wear and tear of the chainsaw blade over time.

As the chainsaw blade wears out, it tends to become dull, leading to increased cutting resistance, reduced efficiency, and heightened cutting losses. Consequently, the blade necessitates sharpening, a process that involves disassembling the chainsaw blade and utilizing specialized equipment for sharpening. This maintenance task can be cumbersome for regular users.

As wear and sharpening cycles progress, the chainsaw blade eventually reaches a point where it is no longer viable for further use and needs replacement. The blade can only be sharpened and reused a limited number of times, resulting in escalated cutting expenses. Therefore, there is a demand for a durable cutting tool that is resistant to wear.

SUMMARY

The objective of the present disclosure is to provide a chainsaw blade, a carbide blade block and a carbide chainsaw blade that addresses the technical problems above.

To address these technical problems, the present disclosure is realized through the following technical solutions.

A chainsaw blade, including a chainsaw blade body, where a bottom of the chainsaw blade body is fixedly connected to a connecting portion, and a top of the chainsaw blade body is fixedly connected to a depth limiting tooth; the top of the saw chain cutter body is fixedly connected to a cutting portion located on a one side of the depth limiting tooth; a concave cutting groove is formed between the depth limiting tooth and the cutting portion, and the cutting portion is bent; a fixing groove is provided on a side of the cutting portion close to the cutting groove, and a carbide blade block is provided on an inner wall of the fixing groove; a depth of the fixing groove is less than a height of the cutting portion, and an opening of the fixing groove is located at an upper side of the cutting portion.

The chainsaw blade body is an intermediate semi-finished product. The plate used to form the chainsaw blade body is formed into the connecting portion, the depth limiting tooth and the cutting portion after shearing and bending, and then the fixing groove is formed by cutting the cutting portion at a position thereof biased toward the cutting groove. The fixing groove is used to fix the carbide blade block, and the size of the carbide blade block is relatively small compared with that of the chainsaw blade body, such that the fixing groove is relatively small compared with the chainsaw blade body. In order to ensure the fastness of the fixing of the carbide blade block, the opening of the fixing groove is located at the upper side of the cutting portion, such that the carbide blade block is inserted into the fixing groove toward the bottom of the fixing groove, and there is sufficient fixing position between the carbide blade block and the chainsaw blade body, which facilitates the determination of the position of the carbide blade block and subsequent processing of a cutting blade with sufficient fastness.

Preferably, a retaining edge is fixedly connected between the fixing groove and the cutting groove, an upper apex position of a side of the retaining edge facing the fixing groove is higher than an apex position of the depth limiting tooth, and a side of the retaining edge facing the cutting groove has a concave are surface.

Preferably, an upper side edge of the retaining edge and an upper side edge of the cutting portion are of an extended structure.

The carbide blade block includes a front portion and a rear portion; the front portion and the rear portion are connected into front and rear sides matched with the fixing groove of the chainsaw blade body; a bottom of the rear portion is a bottom side that matches a bottom inner wall of the fixing groove, and the bottom side of the rear portion is fixedly welded to an inner wall of the fixing groove.

The carbide blade block is mounted to the fixing groove; a front end of the cutting portion of the chainsaw blade body facing the cutting groove is a cutting blade, and the cutting blade comprises a blade body edge formed on a front edge of the fixing groove and a carbide blade formed on a front edge of the carbide blade block; a glue injection assembly is provided inside the carbide blade block.

Preferably, the glue injection assembly includes a threaded insertion cavity disposed inside the rear portion, and a threaded glue injection barrel for injecting glue is inserted into the threaded insertion cavity in a limited manner; a glue injection cavity for inserting the threaded glue injection barrel is provided inside the front portion; one end of the threaded glue injection barrel close to the glue injection cavity is fixedly connected to a plurality of annular equidistantly distributed glue injection strips; a sealing insert block is fixedly connected among the plurality of glue injection strips, a positioning post is fixedly connected to a side of the sealing insert block away from the glue injection strip, and a sealing assembly is provided at one end of the threaded glue injection barrel away from the glue injection strip.

Preferably, a top inner wall of the glue injection cavity is provided with a positioning groove that matches the positioning post.

Preferably, an outer side of the glue injection strip is fixedly connected to a sawtooth cutter.

Preferably, both sides of the front portion are fixedly connected to positioning inserts, and the retaining edge and a side of the cutting portion close to the front portion are provided with slots for the positioning inserts to be inserted in a limited manner.

Preferably, an inner wall of the glue injection cavity is provided with a plurality of annular grooves distributed equidistantly to improve adhesive firmness of the glue.

Preferably, a side of the sealing insert block close to the glue injection strip is fixedly connected to a guide post located among the plurality of glue injection strips; an end of the guide post away from the sealing insert block is a hemispherical structure, and a length of the guide post is greater than a length of the glue injection strip.

Preferably, the sealing assembly includes a sealing insert barrel fixedly installed on an inner side of the threaded glue injection barrel; the threaded glue injection barrel extends to a side of the rear portion away from the front portion; a sealing insert post is provided inside the sealing insert barrel, and the sealing insert post has a prismatic structure; one end of the sealing insert barrel is provided with a groove for the sealing insert post to be inserted in a limited manner; a mounting insert rod is fixedly connected to a side of the sealing insert post close to the sealing insert barrel, and a sealing sleeve in contact with an inner side of the sealing insert barrel is fixedly installed on an outer side of the mounting insert rod; one end of the mounting insert rod away from the sealing insert post is fixedly connected to a limiting block, and an outer diameter of the limiting block is larger than the mounting insert rod.

Preferably, an end of the sealing insert post away from the sealing sleeve is fixedly connected to an limiting outer plate located outside the threaded glue injection barrel, and an end of the limiting outer plate away from the sealing insert post is fixedly connected to an annular pull plate.

Preferably, a plurality of anti-slip strips distributed annularly and equidistantly are provided on an outer side of the sealing sleeve.

Preferably, one end of the sealing insert barrel away from the sealing insert post is fixedly connected to a plurality of elastic sealing strips distributed annularly and equidistantly; the elastic sealing strips have an upwardly curved structure, and a bending groove is provided in a top concave surface of the elastic sealing strips.

In comparison to prior art, the present disclosure offers several advantageous features.

The chainsaw blade is provided with a groove corresponding to the position of the cutting blade. The groove portion is welded and fixed with the carbide blade block. After welding, an integrated structure is formed, and the blade of the carbide chainsaw blade is processed. The blade includes the blade body edge and the carbide blade block. The carbide blade block is used to replace the blade portion originally formed by the chainsaw blade body, thereby improving the cutting wear resistance of the chainsaw blade and reducing the number of grinding times, which in turn improves cutting efficiency while extending the lifetime of the chainsaw blade.

The threaded glue injection barrel is inserted into the glue injection cavity of the front portion through the threaded insertion cavity, facilitating the rapid injection of glue into the glue injection cavity. Rotating the threaded glue injection barrel enables the sawtooth cutter on the glue injection strip to cut the solid glue. The front portion can be removed for disassembly and replacement. The positioning post facilitates the installation of the threaded glue injection barrel, thus, when the carbide blade block is damaged after long-term use, it can be removed and replaced in time.

The sealing sleeve is inserted into the sealing insert barrel to block the threaded glue injection barrel to prevent wood chips from entering the threaded glue injection barrel when the chainsaw blade body is in use. Furthermore, by rotating the annular pull plate, the prismatic structure of the sealing insert post can be utilized to synchronously rotate the threaded glue injection barrel, thereby improving the convenience of disassembly, which achieves the effects of sealing protection and improving disassembly convenience.

BRIEF DESCRIPTION OF THE DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
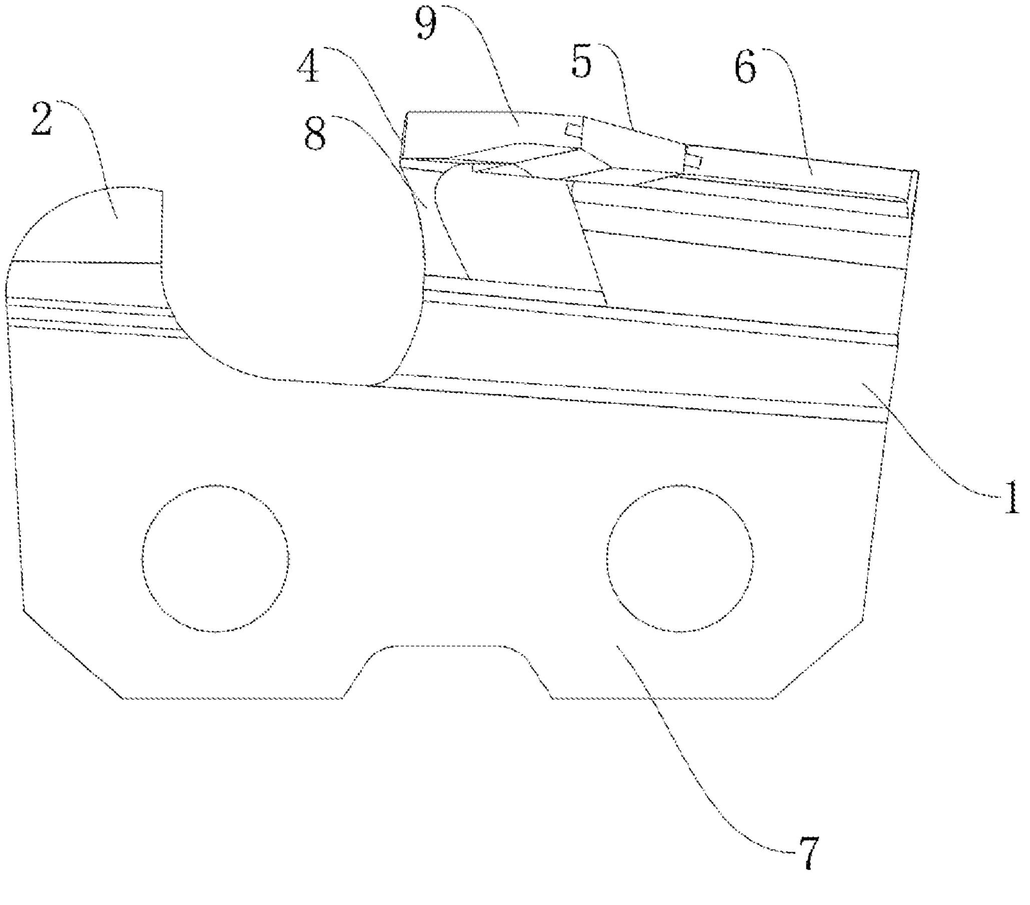
FIG. 1 is a schematic diagram of the overall structure of the chainsaw blade according to the present disclosure.

In the drawings, the parts represented by each number are listed as follows:

1. chainsaw blade; 2. depth limiting tooth; 3. cutting groove; 4. carbide blade; 5. carbide blade block; 6. cutting portion; 7. connecting portion; 8. blade body edge; 9. retaining edge; 10. fixing groove; 11. bottom side; 12. front portion; 13. rear portion; 14. glue injection assembly; 15. threaded insertion cavity; 16. threaded glue injection barrel; 17. glue injection cavity; 18. glue injection strip; 19. sealing insert block; 20. positioning post; 21. positioning groove; 22. sawtooth cutter; 23. sealing assembly; 24. positioning insert; 25. annular groove; 26. guide post; 27. sealing insert barrel; 28. sealing insert post; 29. mounting insert rod; 30. sealing sleeve; 31. limiting outer plate; 32. annular pull plate; 33. limiting block; 34. anti-slip strip; 35. elastic sealing strip.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative efforts fall within the scope of protection of the present disclosure.

Embodiment 1

Referring to FIGS. 1-5, a chainsaw blade is provided, which includes a chainsaw blade body 1. A connecting portion 7 is fixedly connected to the bottom of the chainsaw blade body 1. A depth limiting tooth 2 is fixedly connected to the top of the chainsaw blade body 1, and a cutting portion 6, located on the right side of the depth limiting tooth 2, is fixedly connected to the top of the chainsaw blade body 1. A downwardly concave cutting groove 3 is formed between the depth limiting tooth 2 and the cutting portion 6. The cutting portion 6 is in the form of bending, and a fixing groove 10 is provided on a side of the cutting portion 6 close to the cutting groove 3. The inner wall of the fixing groove 10 is provided with a carbide blade block 5, the depth of the fixing groove 10 is less than the height of the cutting portion 6, and the opening of the fixing groove 10 is located in the upper side edge of the cutting portion 6.

Referring to FIGS. 1-5, the chainsaw blade body 1 is an intermediate semi-finished product. The plate used to form the chainsaw blade body is formed into the connecting portion 7, the depth limiting tooth 2 and the cutting portion 6 after shearing and bending, and then the fixing groove 10 is formed by cutting the cutting portion 6 at a position thereof biased toward the cutting groove 3. The fixing groove 10 is used to fix the carbide blade block 5, and the size of the carbide blade block 5 is relatively small compared with that of the chainsaw blade body 1, such that the fixing groove 10 is relatively small compared with the chainsaw blade body 1. In order to ensure the fastness of the fixing of the carbide blade block 5, the opening of the fixing groove 10 is located at the upper side of the cutting portion 6, such that the carbide blade block 5 is inserted into the fixing groove 10 toward the bottom of the fixing groove 10, and there is sufficient fixing position between the carbide blade block 5 and the chainsaw blade body 1, which facilitates the determination of the position of the carbide blade block 5 and subsequent processing of a cutting blade with sufficient fastness.

Figure 2:
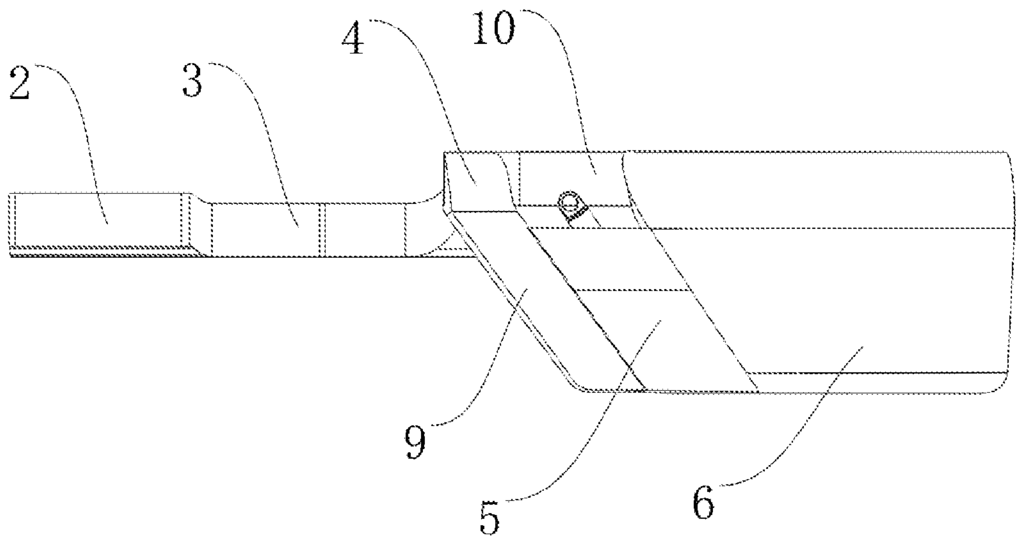
FIG. 2 is a bottom view of the overall structure of the chainsaw blade according to the present disclosure.
Figure 3:
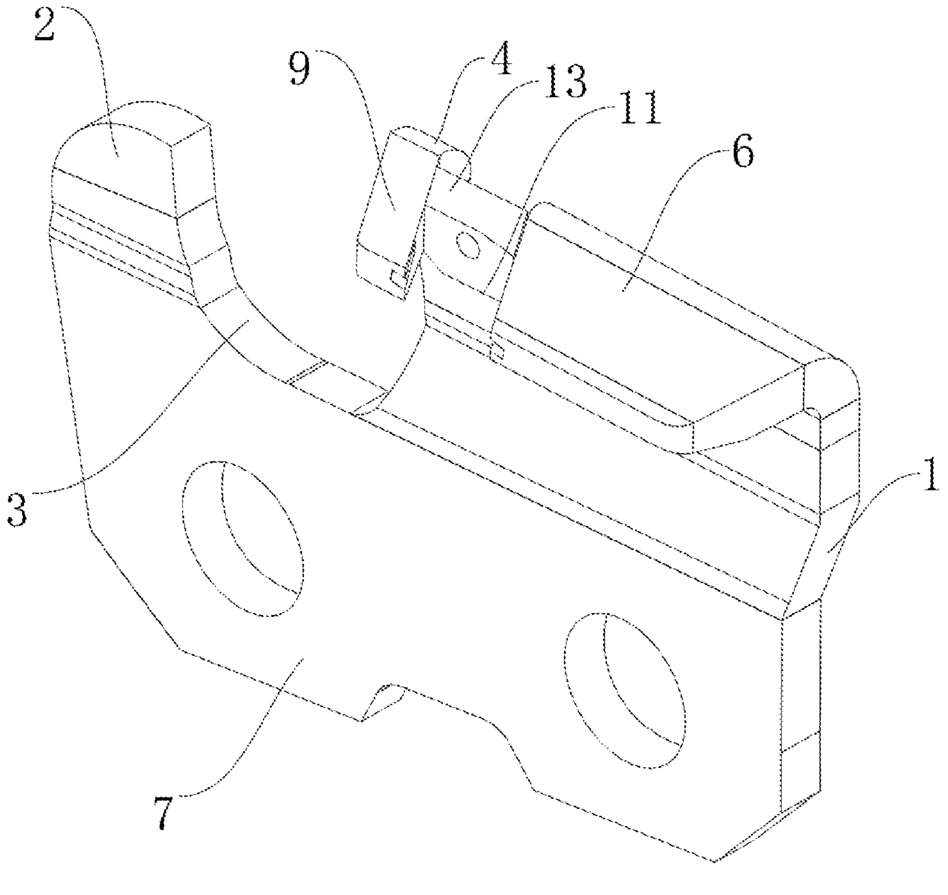
FIG. 3 is a schematic diagram of the chainsaw blade body of the present disclosure.
Figure 4:
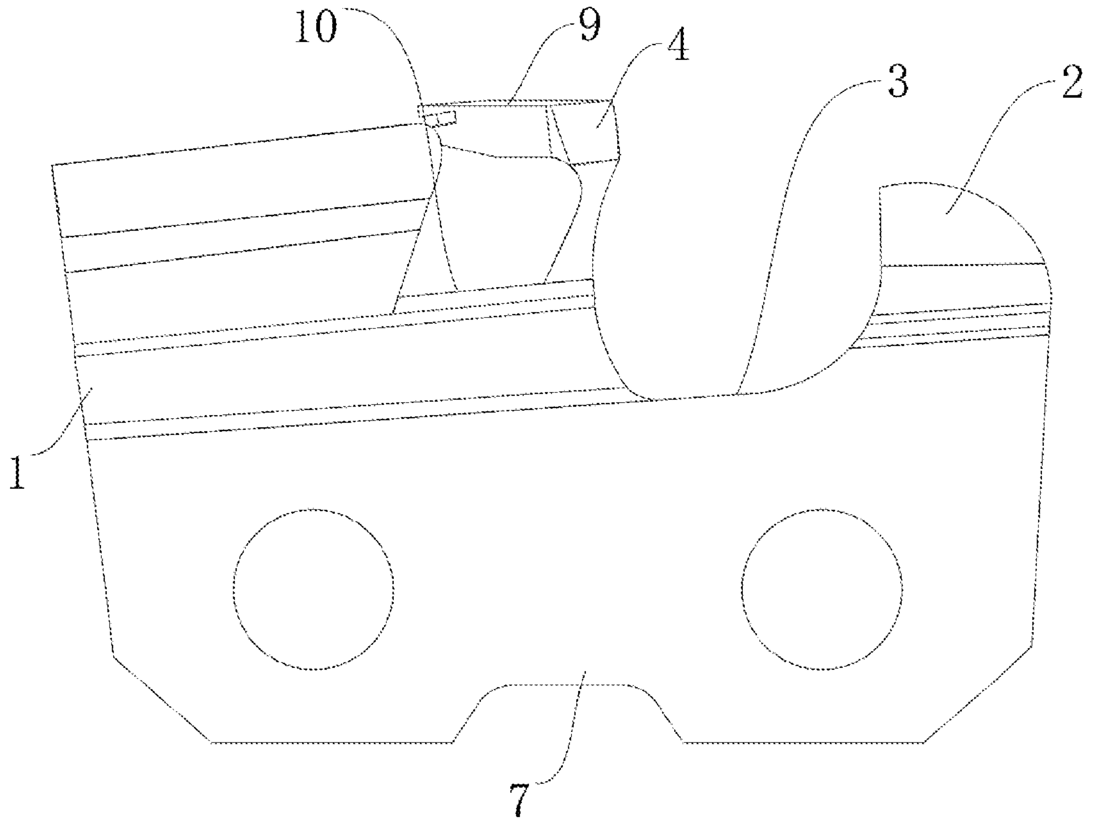
FIG. 4 is a bottom view of the chainsaw blade body of the present disclosure.

Referring to FIGS. 2-4, a retaining edge 9 is fixedly connected between the fixing groove 10 and the cutting groove 3. The upper apex position of the side of the retaining edge 9 facing the fixing groove 10 is higher than the apex position of the depth limiting tooth 2, and the side of the retaining edge 9 facing the cutting groove 3 is in the shape of a concave are surface. The retaining edge 9 is formed after the chainsaw blade body 1 is machined with the fixing groove 10. The carbide blade block 5, after being inserted into the fixing groove 10. will form three sides which contact with the chainsaw blade body 1 and weld therewith. The carbide blade block 5 is inserted into the fixing slot 10, the carbide blade block 5 will form three side edges that are in contact with and welded to the chainsaw blade body 1, improving the positional relationship of the carbide blade block 5 with respect to the chainsaw blade body 1. The retaining edge 9 will be partially excised and partially retained in the machining and cutting of the knife edge. The excised portion of the retaining edge 9 exposes the machined carbide blade 4 of the carbide chainsaw blade body 1, the retained portion thereof is cut to form the blade body edge 8, and the retained portion also maintains a fixed role for the carbide blade block 5.

Referring to FIGS. 1-5, the upper side edge of the retaining edge 9 and the upper side edge of the cutting portion 6 are of an extended structure. The retaining edge 9 is formed with an upper side edge, which belongs to the extended structure of the upper side edge of the cutting portion 6, such that after the carbide blade block 5 is inserted, the upper side surface of the carbide blade block 5 can be localized by means of the upper side surface of the retaining edge 9 and the upper side surface of the cutting portion 6, and the shape and size requirements of the carbide blade block 5 can be ensured.

Referring to FIGS. 2-5, the chainsaw blade further includes a carbide blade block, and the carbide blade block 5 includes a front portion 12 and a rear portion 13. The front portion 12 and the rear portion 13 are connected into front and rear sides matched with the fixing groove 10 of the chainsaw blade body 1. The bottom of the rear portion 13 is a bottom side 11 that matches the bottom inner wall of the fixing groove 10, and the bottom side 11 of the rear portion 13 is fixedly welded to the inner wall of the fixing groove 10.

Referring to FIGS. 1-5, the chainsaw blade further includes a carbide chainsaw blade including a chainsaw blade body 1 and a carbide blade block 5. The carbide chainsaw blade includes a chainsaw blade body 1 provided with a fixing groove 10 and a carbide blade block 5 mounted to the fixing groove 10. The front end of the cutting portion 6 of the chainsaw blade body 1 facing the cutting groove 3 is a cutting blade. The cutting blade consists of two parts, including a blade body edge 8 formed on the front edge of the fixing groove 10 and a carbide blade 4 formed on the front edge of the carbide blade block 5. A glue injection assembly 14 is provided inside the carbide blade block 5. The carbide blade block 5 is used to replace the blade portion originally formed by the chainsaw blade body 1, thereby improving the cutting wear resistance of the chainsaw blade and reducing the number of grinding times, which in turn improves cutting efficiency while extending the lifetime of the chainsaw blade.

Principle of work: The chainsaw blade 1 is provided with a groove corresponding to the position of the cutting blade. The groove portion is welded and fixed with the carbide blade block 5. After welding, an integrated structure is formed, and the blade of the carbide chainsaw blade is processed. The blade includes the blade body edge 8 and the carbide blade block 5. The carbide blade block 5 is used to replace the blade portion originally formed by the chainsaw blade body 1, thereby improving the cutting wear resistance of the chainsaw blade and reducing the number of grinding times, which in turn improves cutting efficiency while extending the lifetime of the chainsaw blade.

Embodiment 2

Referring to FIGS. 5-10, this embodiment further explains Embodiment 1. The glue injection assembly 14 includes a threaded insertion cavity 15 disposed inside the rear portion 13. A threaded glue injection barrel 16 for injecting glue is inserted into the threaded insertion cavity 15 in a limited manner. A glue injection cavity 17 for inserting the threaded glue injection barrel 16 is provided inside the front portion 12. One end of the threaded glue injection barrel 16 close to the glue injection cavity 17 is fixedly connected with a plurality of annular equidistantly distributed glue injection strips 18, and a sealing insert block 19 is fixedly connected among the plurality of glue injection strips 18. A positioning post 20 is fixedly connected to the side of the sealing insert block 19 away from the glue injection strip 18, and the top inner wall of the glue injection cavity 17 is provided with a positioning groove 21 that matches the positioning post 20. The outer side of the glue injection strip 18 is fixedly connected with a sawtooth cutter 22. A sealing assembly 23 is provided at one end of the threaded glue injection barrel 16 away from the glue injection strip 18. The threaded glue injection barrel 16 is inserted into the glue injection cavity 17 of the front portion 12 through the threaded insertion cavity 15, facilitating the rapid injection of adhesive into the glue injection cavity 17. Rotating the threaded glue injection barrel 16 enables the sawtooth cutter 22 on the glue injection strip 18 to cut the solid glue. The front portion 12 can be removed for disassembly and replacement. The positioning post 20 facilitates the installation of the threaded glue injection barrel 16, thus, when the carbide blade block 5 is damaged after long-term use, it can be removed and replaced in time.

Figure 5:
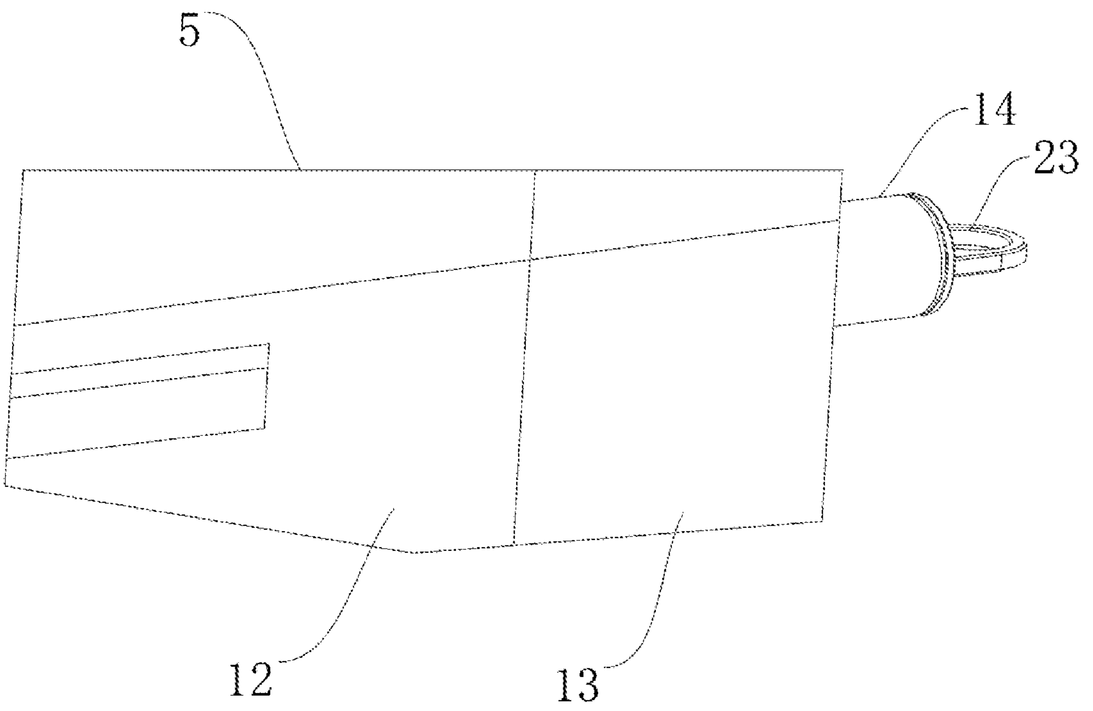
FIG. 5 is a schematic diagram of the carbide blade block of the present disclosure.

Referring to FIGS. 3 and 5, positioning inserts 24 are fixedly connected to both sides of the front portion 12. The retaining edge 9 and a side of the cutting portion 6 close to the front portion 12 are provided with slots for the positioning inserts 24 to be limited and inserted.

Figure 6:
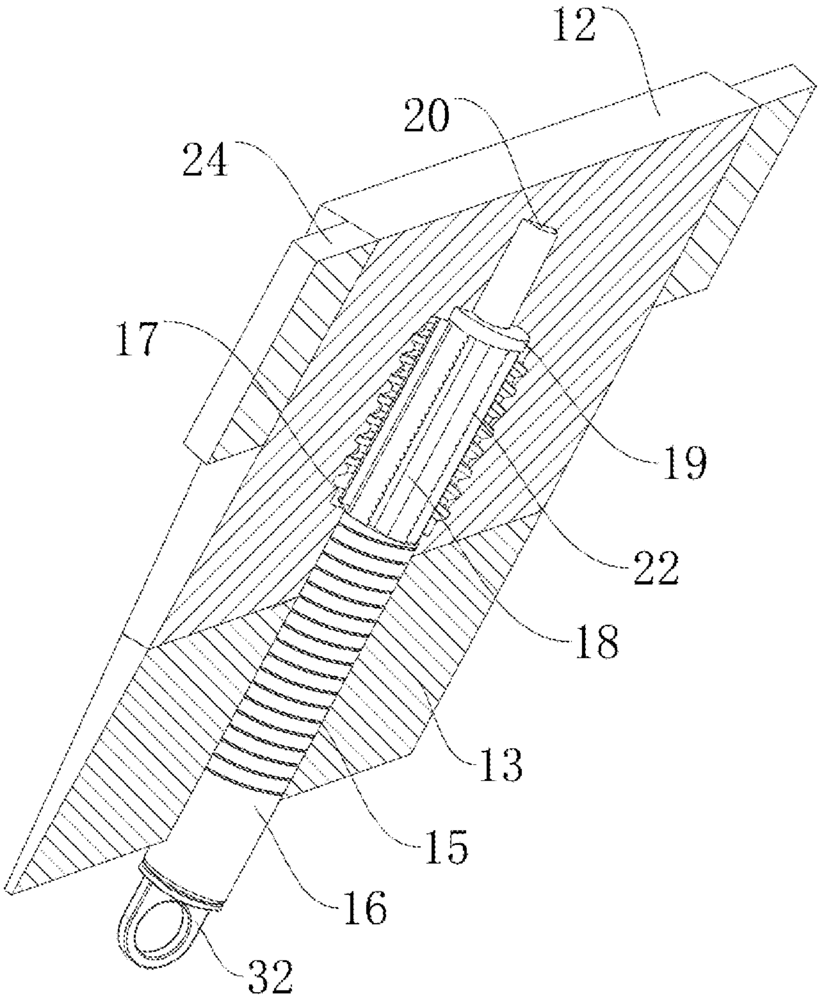
FIG. 6 is a schematic diagram of the threaded glue injection barrel and positioning insert of the present disclosure.
Figure 10:
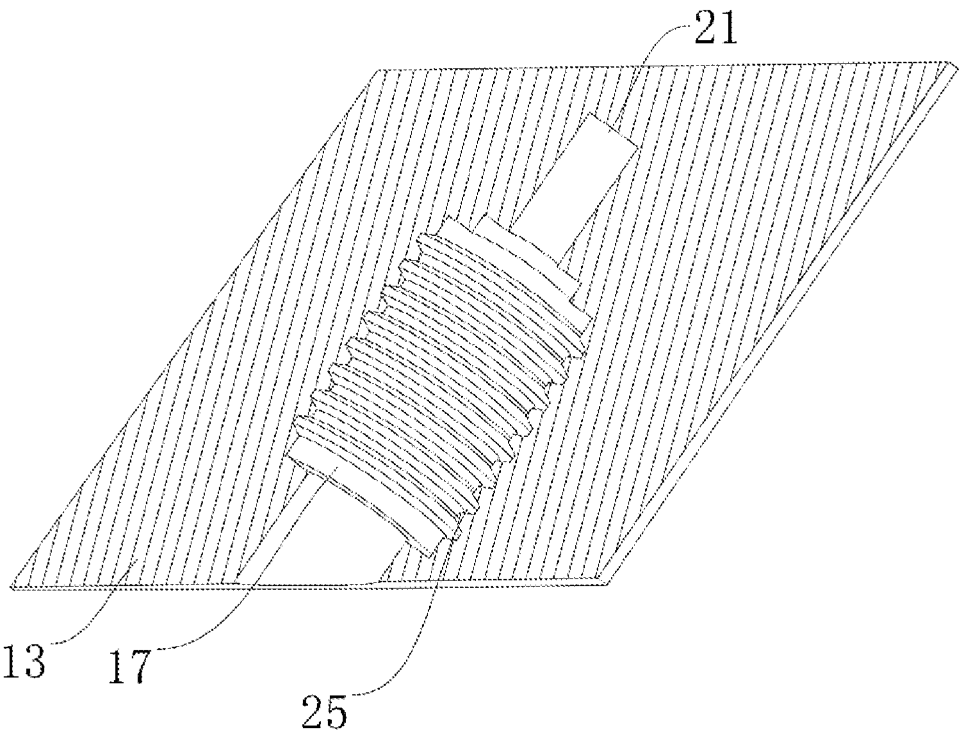
FIG. 10 is a schematic diagram of the internal structure of the front portion of the chainsaw blade of the present disclosure.

Referring to FIGS. 6 and 10, the inner wall of the glue injection cavity 17 is provided with a plurality of annular grooves 25 equidistantly distributed to improve the adhesive firmness and improve the contact surface of the glue.

Figure 7:
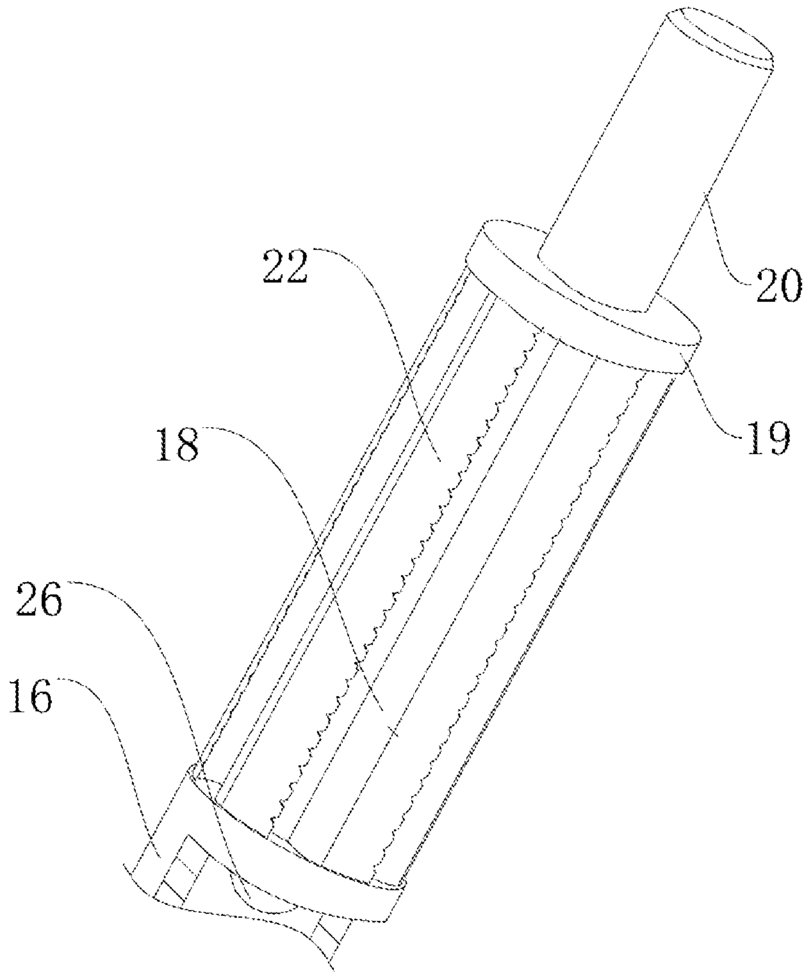
FIG. 7 is a schematic diagram of the threaded glue injection barrel and glue injection strip of the present disclosure.

Referring to FIG. 7, the side of the sealing insert block 19 close to the glue injection strip 18 is fixedly connected with a guide post 26 located among the plurality of glue injection strips 18. The end of the guide post 26 away from the sealing insert block 19 is a hemispherical structure. The length of the guide post 26 is greater than the length of the glue injection strip 18, and the guide post 26 guides the glue to the glue injection strip 18.

Referring to FIGS. 5-9, the sealing assembly 23 includes a sealing insert barrel 27 fixedly installed on the inside of the threaded glue injection barrel 16. The threaded glue injection barrel 16 extends to the side of the rear portion 13 away from the front portion 12. A sealing insert post 28 is provided inside the sealing insert barrel 27, and the sealing insert post 28 has a prismatic structure. One end of the sealing insert barrel 27 is provided with a groove for the sealing insert post 28 to be limited and inserted. A mounting insert rod 29 is fixedly connected to a side of the sealing insert post 28 close to the sealing insert barrel 27, and a sealing sleeve 30 in contact with the inside of the sealing insert barrel 27 is fixedly installed on the outside of the mounting insert rod 29. The end of the sealing insert post 28 away from the sealing sleeve 30 is fixedly connected to an limiting outer plate 31 located outside the threaded glue injection barrel 16, and the end of the limiting outer plate 31 away from the sealing insert post 28 is fixedly connected to an annular pull plate 32. One end of the mounting insert rod 29 away from the sealing insert post 28 is fixedly connected to a limiting block 33, and the outer diameter of the limiting block 33 is larger than the mounting insert rod 29. The sealing sleeve 30 is inserted into the sealing insert barrel 27 to block the threaded glue injection barrel 16 to prevent wood chips from entering the threaded glue injection barrel 16 when the chainsaw blade body 1 is in use. Furthermore, by rotating the annular pull plate 32, the prismatic structure of the sealing insert post 28 can be utilized to synchronously rotate the threaded glue injection barrel 16, thereby improving the convenience of disassembly.

Referring to FIGS. 6 and 7, a plurality of annular anti-slip strips 34 are provided on the outside of the sealing sleeve 30 at equal intervals to increase the friction between the sealing sleeve 30 and the sealing insert barrel 27 and improve the sealing performance thereof.

Figure 8:
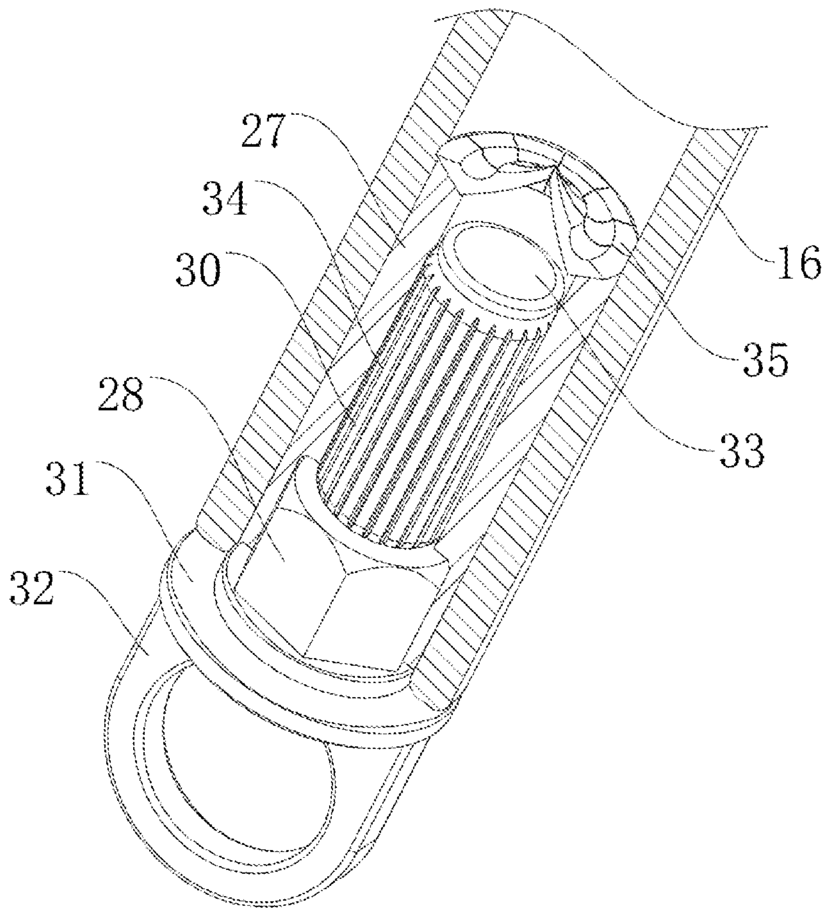
FIG. 8 is a schematic diagram of the elastic sealing strip and sealing insert post of the present disclosure.
Figure 9:
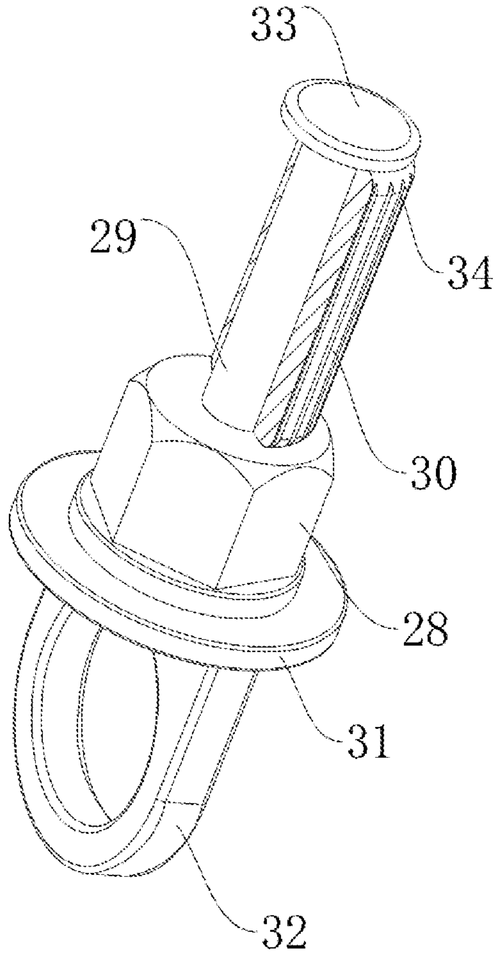
FIG. 9 is a schematic diagram of the sealing assembly of the present disclosure.

Referring to FIGS. 7 and 8, one end of the sealing insert barrel 27 away from the sealing insert post 28 is fixedly connected with a plurality of annular equidistantly distributed elastic sealing strips 35. The elastic sealing strips 35 have an upwardly curved structure. A bending groove is provided in the top concave surface of the elastic sealing strips 35 to prevent excessive glue from sliding out of the sealing insert barrel 27, and the elasticity of the elastic sealing strip 35 can facilitate the insertion of a glue injection device.

In this embodiment, the threaded glue injection barrel 16 is inserted into the glue injection cavity 17 of the front portion 12 through the threaded insertion cavity 15 of the rear portion 13, and is fixed using the threads on the outside of the threaded glue injection barrel 16. Open the sealing insert post 28 to inject glue into the threaded glue injection barrel 16. The glue enters the glue injection cavity 17 through a plurality of glue injection strips 18, such that the front portion 12 and the threaded glue injection barrel 16 are fixed, and the front portion 12 and the rear portion 13 form the carbide blade block 5. And in long-term use, rotating the threaded glue injection barrel 16 can drive multiple glue injection strips 18 to rotate synchronously, such that when the threaded glue injection barrel 16 is taken out, it rotates and moves outward. The solidified glue is cut through the sawtooth cutters 22 on the outside of the glue injection strips 18, such that the front portion 12 can be quickly removed, and the front portion 12 of the carbide blade block 5 that has been used for a long time can be replaced, further improving the durability of the chainsaw blade. Moreover, the sealing sleeve 30 is inserted into the sealing insert barrel 27 to block the threaded glue injection barrel 16 to prevent wood chips from entering the threaded glue injection barrel 16 when the chainsaw blade body 1 is in use. Furthermore, by rotating the annular pull plate 32, the prismatic structure of the sealing insert post 28 can be utilized to synchronously rotate the threaded glue injection barrel 16, thereby improving the convenience of disassembly.

During welding, in order to ensure that the position between the carbide blade block 5 and the chainsaw blade body 1 is stable and does not change, before welding, the carbide blade block 5 is fixed with glue, and the glue injection cavity 17 can increase the glue injection surface and the glue injection amount, further improving the firmness of the glue injection.

It should be noted that in this disclosure, relational terms such as first and second are only used to distinguish one entity or operation from another entity or operation, and do not necessarily require or imply any such actual relationship or sequence between these entities or operations. Furthermore, the terms "include," "comprise," or any other variations thereof are intended to cover a non-exclusive inclusion such that a process, method, object, or apparatus that includes a list of elements includes not only those elements, but also those not expressly listed other elements, or elements inherent to the process, method, article or equipment.

Although the embodiments of the present disclosure have been shown and described, those of ordinary skill in the art will understand that various changes, modifications, substitutions and variations may be made to these embodiments without departing from the principles and spirit of the disclosure, the scope of which is defined by the appended claims and their equivalents.

What is claimed is:

1. A chainsaw blade, comprising a chainsaw blade body, wherein a bottom of the chainsaw blade body is fixedly connected to a connecting portion, and a top thereof is fixedly connected to a depth limiting tooth; the top of the chainsaw blade body is fixedly connected to a cutting portion located on one side of the depth limiting tooth; a concave cutting groove is formed between the depth limiting tooth and the cutting portion, and the cutting portion is bent; a fixing groove is provided on a side of the cutting portion close to the cutting groove, and a carbide block comprising a front portion and a rear portion is provided on an inner wall of the fixing groove; a depth of the fixing groove is less than a height of the cutting portion, and an opening of the fixing groove is located at an upper side of the cutting portion;

a glue injection assembly is provided inside the carbide blade block, wherein the glue injection assembly comprises a threaded insertion cavity disposed inside the rear portion, and a threaded glue injection barrel for injecting glue is inserted into the threaded insertion cavity; a glue injection cavity for inserting the threaded glue injection barrel is provided inside the front portion; one end of the threaded glue injection barrel close to the glue injection cavity is fixedly connected to a plurality of annular equidistantly distributed glue injection strips; a sealing insert block is fixedly connected among the plurality of glue injection strips, a positioning post is fixedly connected to a side of the sealing insert block away from the glue injection strip, and a sealing assembly is provided at one end of the threaded glue injection barrel away from the glue injection strip.

2. The chainsaw blade according to claim 1, wherein a retaining edge is fixedly connected between the fixing groove and the cutting groove, an upper apex position of a side of the retaining edge facing the fixing groove is higher than an apex position of the depth limiting tooth, and a side of the retaining edge facing the cutting groove has a concave arc surface.

3. The chainsaw blade according to claim 2, wherein an upper side edge of the retaining edge and an upper side edge of the cutting portion are of an extended structure.

4. The chainsaw blade according to claim 1, wherein the front and rear portion are connected into front and rear sides matched with the fixing groove of the chainsaw blade body; a bottom of the rear portion is a bottom side that matches a bottom inner wall of the fixing groove, and the bottom side of the rear portion is fixedly welded to an inner wall of the fixing groove.

5. The chainsaw blade according to claim 4, wherein the carbide blade block is mounted to the fixing groove; a front end of the cutting portion of the chainsaw blade body facing the cutting groove is a cutting blade, and the cutting blade comprises a blade body edge formed on a front edge of the fixing groove and a carbide blade formed on a front edge of the carbide blade block.

6. The chainsaw blade according to claim 1, wherein a top inner wall of the glue injection cavity is provided with a positioning groove that matches the positioning post.

7. The chainsaw blade according to claim 1, wherein an outer side of the glue injection strip is fixedly connected to a sawtooth cutter.

8. The chainsaw blade according to claim 1, wherein both sides of the front portion are fixedly connected to positioning inserts, and the retaining edge and a side of the cutting portion close to the front portion are provided with slots for the positioning inserts to be inserted in a limited manner.

9. The chainsaw blade according to claim 1, wherein an inner wall of the glue injection cavity is provided with a plurality of annular grooves that are equidistantly distributed.

10. The chainsaw blade according to claim 1, wherein a side of the sealing insert block close to the glue injection strip is fixedly connected to a guide post located among the plurality of glue injection strips; an end of the guide post away from the sealing insert block is a hemispherical structure, and a length of the guide post is greater than a length of the glue injection strip.

11. The chainsaw blade according to claim 1, wherein the sealing assembly includes a sealing insert barrel fixedly installed on an inner side of the threaded glue injection barrel; the threaded glue injection barrel extends to a side of the rear portion away from the front portion; a sealing insert post is provided inside the sealing insert barrel, and the sealing insert post has a prismatic structure; one end of the sealing insert barrel is provided with a groove for the sealing insert post to be inserted in a limited manner; a mounting insert rod is fixedly connected to a side of the sealing insert post close to the sealing insert barrel, and a sealing sleeve in contact with an inner side of the sealing insert barrel is fixedly installed on an outer side of the mounting insert rod; one end of the mounting insert rod away from the sealing insert post is fixedly connected to a limiting block, and an outer diameter of the limiting block is larger than the mounting insert rod.

12. The chainsaw blade according to claim 11, wherein an end of the sealing insert post away from the sealing sleeve is fixedly connected to an limiting outer plate located outside the threaded glue injection barrel, and an end of the limiting outer plate away from the sealing insert post is fixedly connected to an annular pull plate.

13. The chainsaw blade according to claim 11, wherein a plurality of anti-slip strips distributed annularly and equidistantly are provided on an outer side of the sealing sleeve.

14. The chainsaw blade according to claim 11, wherein one end of the sealing insert barrel away from the sealing insert post is fixedly connected to a plurality of elastic sealing strips distributed annularly and equidistantly; the elastic sealing strips have an upwardly curved structure, and a bending groove is provided in a top concave surface of the elastic sealing strips.

* * * * *